US009454806B2

(12) United States Patent
Pajak et al.

(10) Patent No.: US 9,454,806 B2
(45) Date of Patent: Sep. 27, 2016

(54) EFFICIENT APPROXIMATE-NEAREST-NEIGHBOR (ANN) SEARCH FOR HIGH-QUALITY COLLABORATIVE FILTERING

(71) Applicant: NVIDIA Corporation, Santa Clara, CA (US)

(72) Inventors: Dawid Stanislaw Pajak, San Jose, CA (US); Yun-Ta Tsai, Santa Clara, CA (US); Markus Steinberger, Graz (AT)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/632,782

(22) Filed: Feb. 26, 2015

(65) Prior Publication Data

US 2015/0206285 A1     Jul. 23, 2015

Related U.S. Application Data

(63) Continuation-in-part of application No. 14/600,507, filed on Jan. 20, 2015.

(60) Provisional application No. 61/929,889, filed on Jan. 21, 2014.

(51) Int. Cl.
*G06T 5/00* (2006.01)

(52) U.S. Cl.
CPC ..... *G06T 5/002* (2013.01); *G06T 2207/10024* (2013.01); *G06T 2207/20021* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 4,780,744 A | 10/1988 | Porter et al. | |
| 6,430,430 B1 * | 8/2002 | Gosche | G06T 7/0012 128/920 |
| 2002/0181964 A1 | 12/2002 | Campbell et al. | |
| 2004/0070586 A1 | 4/2004 | Taubin | |
| 2011/0222597 A1 * | 9/2011 | Xu | H04N 19/70 375/240.01 |
| 2011/0299770 A1 * | 12/2011 | Vaddadi | G06K 9/6211 382/165 |
| 2013/0322733 A1 * | 12/2013 | Tarnowski | G06T 7/0004 382/141 |
| 2015/0036945 A1 * | 2/2015 | Zuliani | G06T 5/005 382/266 |
| 2015/0070470 A1 * | 3/2015 | McMurrough | G06F 3/013 348/46 |
| 2015/0110386 A1 * | 4/2015 | Lin | G06T 5/002 382/159 |
| 2015/0227817 A1 * | 8/2015 | Lin | G06K 9/6212 382/170 |
| 2015/0363660 A1 * | 12/2015 | Vidal | G06K 9/46 382/173 |
| 2016/0034544 A1 * | 2/2016 | Ramanujan | G06F 17/30554 707/722 |

* cited by examiner

Primary Examiner — Li Liu

(57) ABSTRACT

A computer implemented method of performing an approximate-nearest-neighbor search is disclosed. The method comprises dividing an image into a plurality of tiles. Further, for each of the plurality of tiles, perform the following in parallel on a processor: (a) dividing image patches into a plurality of clusters, wherein each cluster comprises similar images patches, and wherein the dividing continues recursively until a size of a cluster is below a threshold value; (b) performing a nearest-neighbor query within each of the plurality of clusters; and (c) performing collaborative filtering in parallel for each image patch, wherein the collaborative filtering aggregates and processes nearest neighbor image patches from a same cluster containing a respective image patch to form an output image.

21 Claims, 12 Drawing Sheets

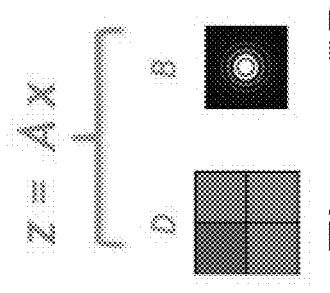
Figure 5A
Figure 5B

1. Choose the first patch in the node as the first center.
2. Compute $\ell^2$ norm $n_i$ between the first patch and every other patch and normalize the distances with $c_i = \frac{\sum_{j \leq i} n_j}{\sum_i n_i}$. The first patch with $c_i$ greater than the threshold $\tau$ (we use $\tau = 0.5$) is selected as the second center.

US 9,454,806 B2

EFFICIENT APPROXIMATE-NEAREST-NEIGHBOR (ANN) SEARCH FOR HIGH-QUALITY COLLABORATIVE FILTERING

CROSS-REFERENCE TO RELATED APPLICATIONS

The present application is a continuation-in-part of U.S. patent application Ser. No. 14/600,507, filed Jan. 20, 2015, entitled "UNIFIED OPTIMIZATION METHOD FOR END-TO-END CAMERA IMAGE PROCESSING," naming Dawid Stanislaw Pajak, Felix Heide, Nagilla Dikpal Reddy, Mushfiqur Rouf, Jan Kautz, Kari Pulli, and Orazio Gallo as inventors, and having attorney docket number NVID-PSC-14-0054-US1, which is a conversion of and claims priority to and the benefit of Provisional Patent Application No. 61/929,889, entitled "UNIFIED OPTIMIZATION METHOD FOR END-TO-END CAMERA IMAGE PROCESSING," having a filing date of Jan. 21, 2014, and having attorney docket number NVID-P-SC-14-0054-US0, which is herein incorporated by reference in its entirety. Both applications are incorporated herein by reference in their entirety and for all purposes.

FIELD OF THE INVENTION

Embodiments according to the present invention generally relate to graphics processing units (GPUs) and more specifically to rendering high-quality digital images using GPUs.

BACKGROUND OF THE INVENTION

Modern camera systems rely heavily on computational processing to produce high-quality digital images. Even with relatively simple camera designs, reconstructing a photograph from raw sensor measurements is a complicated process that involves many complex tasks, including dead-pixel elimination, noise removal, spatial upsampling of subsampled color information (e.g., demosaicking of Bayer color filter arrays), sharpening and image compression. More specialized camera architectures may require additional processing.

FIG. 1 is an illustration of an exemplary conventional hardware implemented image processing pipeline on an image signal processor (ISP) for photograph reconstruction. The complexity of the process for reconstructing a final output photograph 20 from raw sensor measurements 10 is typically tackled by splitting the image processing into several independent stages forming a reconstruction pipeline as shown in FIG. 1. Conventional image processing pipelines for capturing, displaying, and storing images are usually defined as a series of cascaded modules, e.g., denoising 30, demosaicking 40, etc., each one responsible for addressing a particular problem and working on an output of an upstream module. Splitting image reconstruction into smaller, seemingly independent tasks has the potential benefit of making the whole process more manageable, but this approach also have several severe shortcomings First, most of the individual stages are mathematically ill-posed and rely heavily on heuristics and prior information to produce good results. The following stages then treat the results of these heuristics as ground-truth input, aggregating the mistakes through the pipeline. In other words, while the pipeline approach offers many of the benefits of the classic divide-and-conquer methodology, it also introduces a cumulative error, as each step in the pipeline only considers the output of the previous step, not the raw sensor data. The results of this cumulative error include artifacts such as noise residual, zipper artifacts, or color fringing, etc.

Secondly, the individual stages of the pipeline are in fact not truly independent, and there often exists no natural order in which the stages should be processed. For example, if denoising 30 follows demosaicking 40 in the pipeline, the demosaicking step must be able to deal with noisy input data when performing edge detection and other such tasks required for upsampling of the color channels. All these challenges of the pipeline approach are exacerbated by more complex image processing needs in modern computational cameras.

Further, another problem with current ISPs is that their architecture is rigid and, therefore, implementing new computational photography applications is not straightforward or efficient. Because the ISP pipeline is implemented in hardware and is specific to one design it is not easily portable to different hardware implementations, e.g., different camera models, etc. For example, several new photography applications and camera types have been developed that deviate from a regular Bayer image capture and, therefore, map poorly to the rigid design of current ISPs.

BRIEF SUMMARY OF THE INVENTION

Accordingly, a need exists to replace the traditional hardware pipeline approach with a single, integrated, end-to-end, software optimization framework for image reconstruction, so that an output image can be produced from raw input data without needing to linearly step through all the discrete stages of an image processing pipeline. Embodiments of the present invention, therefore, avoid the tuning difficulties of the pipelined approach and prevent errors from accumulating through a hardware pipeline. Embodiments of the present invention also adopt a software framework for producing an output image that is flexible and efficient enough to be applied to a wide range of camera systems and applications.

In one embodiment of the present invention, the traditional hardware module pipeline is replaced with a unified and flexible camera processing system that leverages natural-image priors and modern optimization techniques. For example, in one embodiment the traditional pipeline is replaced with a single, integrated inverse problem that is solved with modern optimization methods while preserving the modularity of the image formation process stages. The reconstruction process can, in one embodiment, be implemented in software. Instead of applying different heuristics in each pipeline stage, embodiments of the present invention provide a single point to inject image priors and regularizers in a methodical fashion. Further, the software embodiments are more flexible across different camera designs.

Further, despite the integration of the individual tasks into a single optimization problem, embodiments of the present invention can easily adapt the framework to different image formation models and camera types by simply providing a procedural software implementation of the forward image formation model. This image formation model is typically composed of a sequence of independent linear transformations (e.g., lens blur followed by spatial sampling of the color information, followed by additive noise).

In one embodiment, the image formation model is also combined with a set of image priors. In one embodiment, the priors can be implemented independent of each other or the image formation system to which they are applied. Accordingly, this enables sharing and re-using high performance implementations of both the image formation process stages and the image priors for different applications. Because the optimization of the forward model and the image priors are highly parallelizable, embodiments of the present invention can be implemented efficiently on GPUs.

In one embodiment, a computer implemented method of performing an approximate-nearest-neighbor search is disclosed. The method comprises dividing an image into a plurality of tiles. Further, for each of the plurality of tiles, perform the following in parallel on a processor: (a) dividing image patches into a plurality of clusters, wherein each cluster comprises similar images patches, and wherein the dividing continues recursively until a size of a cluster is below a threshold value; (b) performing a nearest-neighbor query within each of the plurality of clusters; and (c) performing collaborative filtering in parallel for each image patch, wherein the collaborative filtering aggregates and processes nearest neighbor image patches from a same cluster containing a respective image patch to form an output image.

In another embodiment, a non-transitory computer-readable storage medium having stored thereon, computer executable instructions that, if executed by a computer system cause the computer system to perform a method of performing an approximate-nearest-neighbor search is disclosed. The method comprises dividing an image into a plurality of tiles. Further, for each of the plurality of tiles, perform the following in parallel on a processor: (a) dividing image patches into a plurality of clusters, wherein each cluster comprises similar images patches, and wherein the dividing continues recursively until a size of a cluster is below a threshold value; (b) performing a nearest-neighbor query within each of the plurality of clusters; and (c) performing collaborative filtering in parallel for each image patch, wherein the collaborative filtering aggregates and processes nearest neighbor image patches from a same cluster containing a respective image patch to form an output image.

In a different embodiment, a system for performing an approximate-nearest-neighbor search is disclosed. The system comprises a memory storing information related to denoising an image and a processor coupled to the memory, the processor operable to implement a method of performing an approximate-nearest-neighbor search, the method comprising dividing an image into a plurality of tiles. Further, for each of the plurality of tiles, perform the following in parallel on a processor: (a) dividing image patches into a plurality of clusters, wherein each cluster comprises similar images patches, and wherein the dividing continues recursively until a size of a cluster is below a threshold value; (b) performing a nearest-neighbor query within each of the plurality of clusters; and (c) performing collaborative filtering in parallel for each image patch, wherein the collaborative filtering aggregates and processes nearest neighbor image patches from a same cluster containing a respective image patch to form an output image.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 5A illustrates the manner in which the image formation model can be expressed as a linear system.

FIG. 5B illustrates that the transformations B and D can be subsumed in a matrix A.

Figure 1:
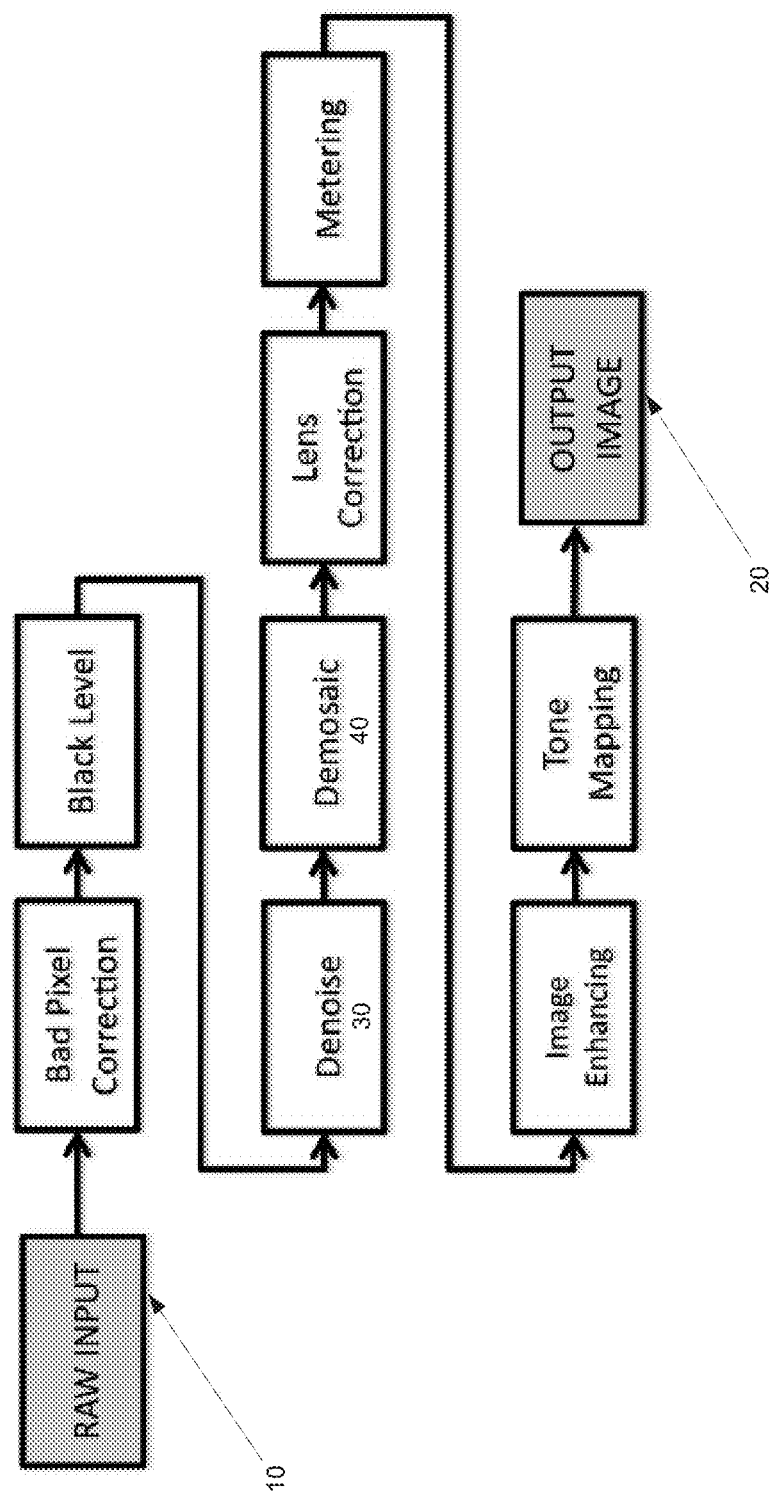
FIG. 1 is an illustration of an exemplary conventional hardware implemented image processing pipeline implemented on an image signal processor (ISP) for photograph reconstruction.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follows are presented and discussed in terms of a process or method. Although steps and sequencing thereof are disclosed in figures (e.g. FIG. 11) herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "run," "determine," "compute," "assign," (e.g., flowcharts 1150 and 1250) or similar electronic computing device or processor (e.g., system 100 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Further, while embodiments described herein may make reference to a GPU, it is to be understood that the circuits and/or functionality described herein could also be implemented in other types of processors, such as general-purpose or other special-purpose coprocessors, or within a CPU.

Figure 2:
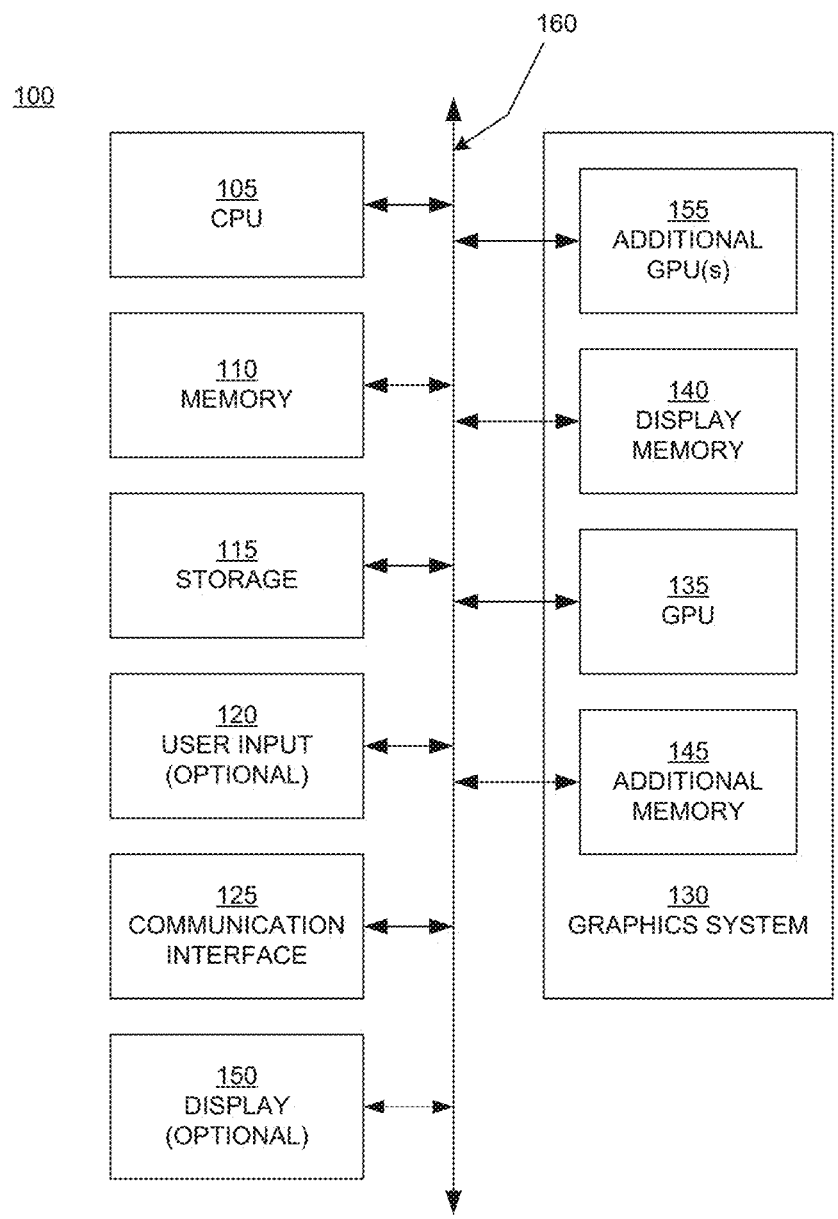
FIG. 2 is a block diagram of an example of a computing system capable of implementing embodiments according to the present invention.

FIG. 2 is a block diagram of an example of a computer system 100 capable of implementing embodiments according to the present invention. In one embodiment, the integrated, end-to-end optimization framework for image reconstruction of the present invention may be implemented on a GPU 135, GPU 155 or CPU 105 of exemplary computer system 100.

In the example of FIG. 1, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including an Intranet or the Internet. In one embodiment, the computer system 100 receives instructions and user inputs from a remote computer through communication interface 125. Communication interface 125 can comprise a transmitter and receiver for communicating with remote devices.

The optional display device 150 may be any device capable of displaying visual information in response to a signal from the computer system 100.

The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. The physical GPU 135 can be configured as multiple virtual GPUs that may be used in parallel (concurrently) by a number of applications or processes executing in parallel. In one embodiment, the optimization of the forward model and the image priors of the present invention are highly parallelizable and can be implemented efficiently on GPU 135.

Graphics memory may include a display memory 140 (e.g., a framebuffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications or processes executing in parallel. Each additional GPU 155 can operate in conjunction with the GPU 135, for example, to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 3:
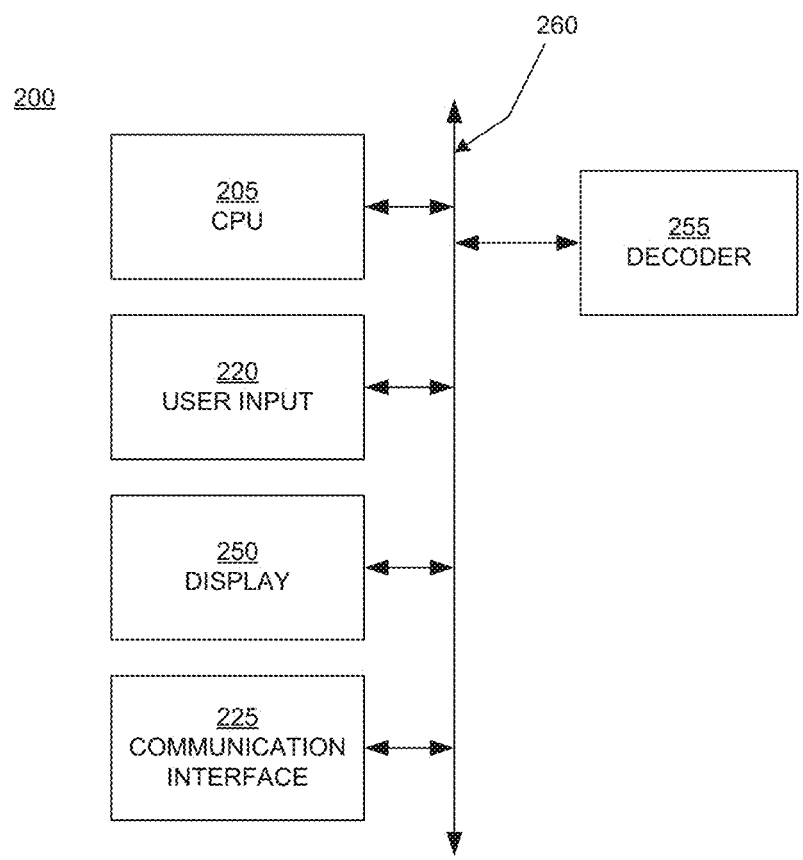
FIG. 3 is a block diagram of an example of an end user or client device capable of implementing embodiments according to the present invention.

FIG. 3 is a block diagram of an example of an end user or client device 200 capable of implementing embodiments according to the present invention. In the example of FIG. 3, the client device 200 includes a CPU 205 for running software applications and optionally an operating system. The user input 220 includes devices that communicate user inputs from one or more users and may include keyboards, mice, joysticks, touch screens, and/or microphones. The communication interface 225 allows the client device 200 to communicate with other computer systems (e.g., the computing system 100 of FIG. 1) via an electronic communications network, including wired and/or wireless communication and including the Internet.

The decoder 255 may be any device capable of decoding (decompressing) data that may be encoded (compressed). For example, the decoder 255 may be an H.264 decoder. The display device 250 may be any device capable of displaying visual information, including information received from the decoder 255. In particular, as will be described below, the display device 250 may be used to display visual information received from the computing system 100. The components of the client device 200 may be coupled via one or more data buses 260.

Relative to the computing system 100, the client device 200 in the example of FIG. 3 may have fewer components and less functionality and, as such, may be referred to as a thin client. However, the client device 200 may include other components including those described above. In one embodiment, an image reconstructed on computing system 100 in accordance with the principles of the present invention and may be transmitted to client device 200 over a network.

In general, the client device 200 may be any type of device that has display capability, the capability to decode (decompress) data, and the capability to receive inputs from a user and send such inputs to the computing system 100. However, the client device 200 may have additional capabilities beyond those just mentioned. The client device 200 may be, for example, a personal computer, a tablet computer, a mobile device, a gaming console, a television, or the like.

An Efficient Approximate-Nearest-Neighbor (ANN) Search for High-Quality Collaborative Filtering 1. Flexible Camera Image Processing Framework Embodiments of the present invention replace the traditional camera image processing pipeline with a single, integrated, end-to-end optimization framework for image reconstruction, so that an output image can be produced from raw input data without needing to linearly step through all the discrete stages of an image processing pipeline. Embodiments of the present invention, therefore, avoid the tuning difficulties of the pipelined approach and prevent errors from accumulating through a pipeline. Embodiments of the present invention also adopt a framework for producing an output image that is flexible and efficient enough to be applied to a wide range of camera systems and applications. Further, the software embodiments of the present invention are flexible across different camera designs.

Embodiments of the present invention provide an end-to-end system that is aware of the camera and image model, enforces natural-image priors, while jointly accounting for common image processing steps like demosaicking, denoising, deconvolution, and so forth, all directly in a given output representation (e.g., YUV, DCT). Further, embodiments of the present invention are flexible and function equally well on different types of images, e.g., Bayer images and images from custom sensors.

In one embodiment of the present invention, the traditional hardware module implemented pipeline is replaced with a unified and flexible camera processing system that leverages natural-image priors and modern optimization techniques. For example, in one embodiment the traditional pipeline is replaced with a single, integrated inverse problem that is solved with modern optimization methods while preserving the modularity of the image formation process stages. Instead of applying different heuristics in each pipeline stage, embodiments of the present invention provide a single point to inject image priors and regularizers in a methodical fashion.

Further, despite the integration of the individual tasks into a single optimization problem, embodiments of the present invention can easily adapt the framework to different image formation models (e.g., single and burst capture with Bayer sensor, interlaced HDR sensor, camera color array, etc.) and camera types by simply providing a software procedural implementation of the forward image formation model. As mentioned, the proximal operator framework of the present invention may be implemented in software, which makes it easily adaptable to various different camera designs. The image formation model, in one embodiment, is typically composed of a sequence of independent linear transformations (e.g., lens blur followed by spatial sampling of the color information, followed by additive noise). The image formation model and any image priors and regularization terms are expressed as a single objective function, which is solved using a proximal operator framework.

The image formulation model is also combined with a set of exemplary image priors. In one embodiment, the priors can be implemented independent of each other or the image formation system that they are applied to. Accordingly, this enables sharing and re-using high performance implementations of both the image formation process stages and the image priors for different applications. Because the optimization of the forward model and the image priors are highly parallelizable, embodiments of the present invention can be implemented efficiently on GPUs. In other embodiments, the present invention may also be implemented on custom ASICs or FPGAs.

Addressing sub-problems, e.g., demosaicking, denoising, etc. separately does not yield the best quality reconstructions especially for complex image formation models. While traditionally certain techniques have been used to cumulatively address one or more sub-problems together, all the proposed techniques address a specific subset of the image processing pipeline for a single camera design. By contrast, embodiments of the present invention provide a single, flexible image optimization framework that can be applied to many different applications and camera designs. In one embodiment, the present invention uses the primal-dual method and proximal operators for optimization.

The following discussion presents the image reconstruction framework by first formulating the problem to be addressed as a linear least-squares problem with non-linear and possibly non-convex regularizers. Subsequently, the discussion will cover the manner in which standard, non-linear optimization algorithms can be applied to the solution of this inverse problem using proximal operators for the data term and the individual regularizers.

Figure 4:
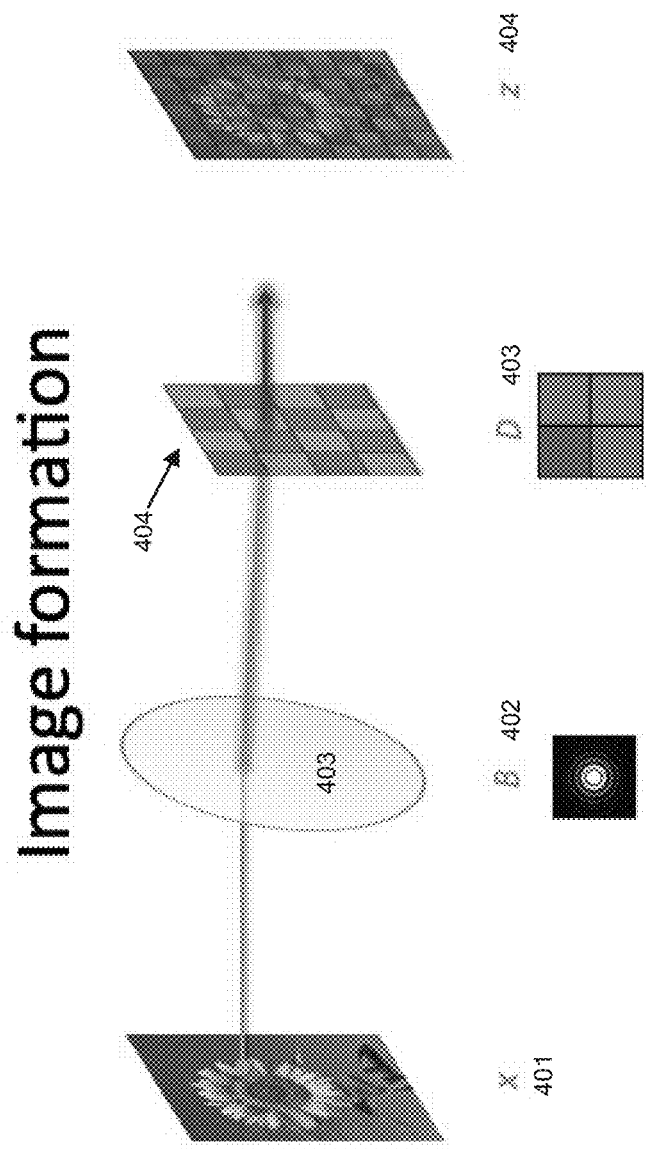
FIG. 4 illustrates a basic exemplary image formal model.

FIG. 4 illustrates a basic exemplary image formal model. The unknown latent image x 401 and the observed image z 404 can be represented as vectors. Depending on the camera and its lens, sensor, and so forth, the latent image undergoes various transformations. In the example of a Bayer pattern sensor (as shown in FIG. 4), the latent image z can be an n-vector with only one color sample per pixel, while the latent image x is a N=3n-vector, where the first n terms are the red channel values, the next n terms are the greens, and the rest are blues. This sub-sampling can be modeled as a projection operator, expressed as an n×N matrix D 403.

Further, the latent image may undergo blurring due to the camera's anti-aliasing filter and scattering in the lens system 403. As light enters the scene, it traverses through the lens system 403, which causes blur. Due to the linear nature of these optical processes, the image transformation can be expressed as a matrix B operating on the image vector.

The color-filter array 404 essentially decimates the light before it hits the sensor. The problem to be solved then is to estimate the latent image x from the corrupted, sparse and noisy observations z.

FIG. 5A illustrates the manner in which the image formation model can be expressed as a linear system. The transformations B and D applied to latent image x result in observed image z. FIG. 5B illustrates that the transformations B and D can be subsumed in a matrix A.

Figure 6A:
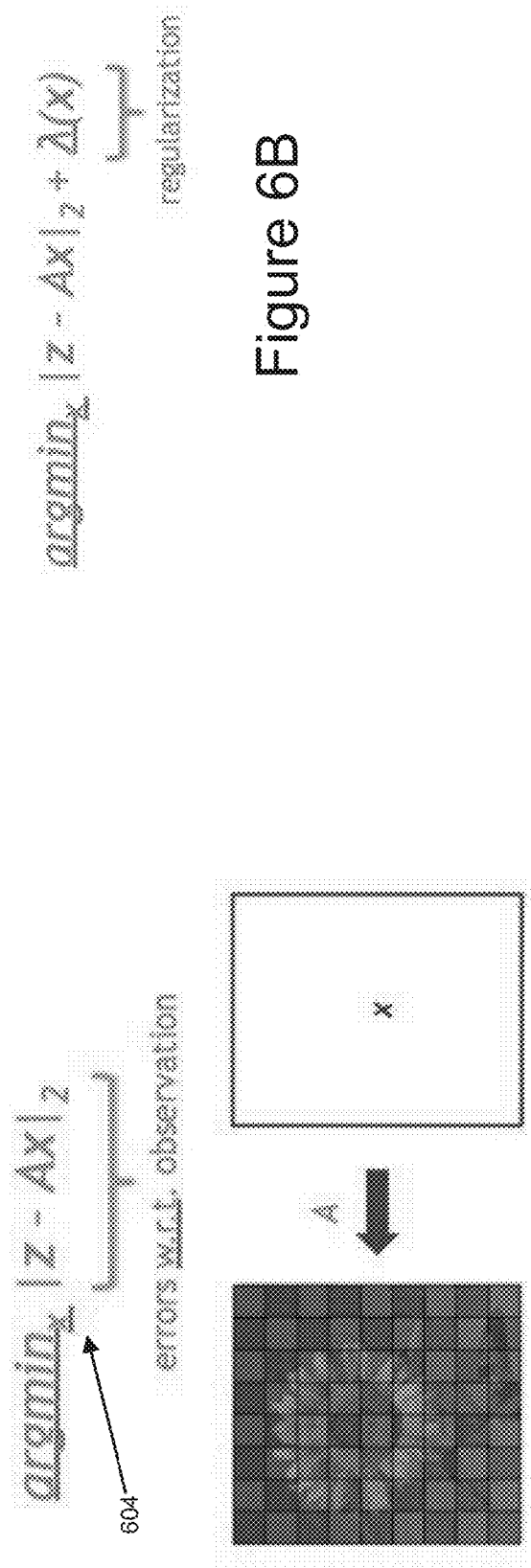
FIG. 6A illustrates the manner in which the latent image x may be found using a linear least square optimization in accordance with an embodiment of the present invention.

FIG. 6A illustrates the manner in which the latent image x may be found using a linear least square optimization in accordance with an embodiment of the present invention. The error with respect to the observation can be stated as z−A x. Iterating over the least squares expression 604 shown in FIG. 6A then minimizes the error with respect to the observation with each iteration. However, the problem illustrated in FIG. 6 may tend to be severely under-constrained. The data term 604 by itself is typically not sufficient due to information loss inherent in transformations such as blurring and sub-sampling.

Figure 6B:
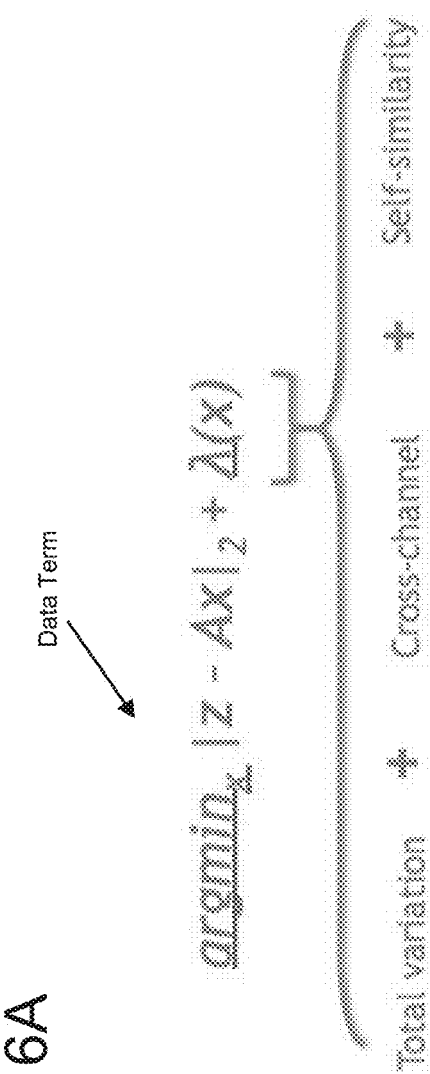
FIG. 6B illustrates the manner in which the inverse problem can be regularized with a non-linear and possibly non-convex term $\lambda(x)$.

FIG. 6B illustrates the manner in which the inverse problem can be regularized with a non-linear and possibly non-convex term A (x). In order to solve this problem then, image priors can be used as regularizers in one embodiment of the present invention.

Figure 6C:
FIG. 6C illustrates the three exemplary image priors that can be used as regularizers in accordance with an embodiment of the present invention.

In one embodiment, a set of three exemplary image priors can be used as regularizers. However, in different embodiments additional or fewer priors may be used as well. FIG. 6C illustrates the three image priors that can be used as regularizers in accordance with an embodiment of the present invention.

1.1 Total Variation Prior

In one embodiment, a total variation prior is used as an exemplary regularizer. As one of ordinary skill in the art would know, total variation refers to the sum of gradients over the image. The total variation image prior minimizes total variation. Minimizing total variation preservers strong edges but encourages their sparsity, thus, reducing noise.

1.2 Cross Channel Prior

In one embodiment, a cross-channel prior may also be used as an exemplary regularizer. The cross-channel prior is used to ensure edge consistency between color channels and avoid color fringing. The cross-channel prior reduces color aberration by forcing edges in an image to be in the same position in each color channel. Essentially, the cross-channel prior reduces color aberration by constraining the gradients of different color channels.

1.3 Denoising Prior (Self-Similarity Prior)

In one embodiment, any Gaussian denoiser can be expressed as a proximal operator and be used in the framework of the present invention. In one embodiment, it is particularly useful to use self-similarity-imposing denoisers. Collaborative denoising priors, for example, exploit the self-similarity property of images. Most typical images will comprise several patches that are similar to each other, e.g., several patches on a subject's forehead many contain many similarities to each other. The information between the patches can be aggregated to denoise a particular patch.

Several different denoisers can be used, e.g., BM3D, NLM, sliding DCT, etc, wherein each of the denoisers may have different ways of aggregating patches. For example, sliding DCT uses collaborative filtering, NLM uses self-similarity, and patch-based NLM and BM3D use both.

The denoisers discussed above can be computationally intensive. As will be explained below, embodiments of the present invention introduce a computationally efficient method for performing high-quality collaborative filtering that enhances the performance of a denoising prior that uses collaborative filtering. Using such denoisers, the entire photo translation process can be performed with acceptable delay for commercial camera applications.

1.4 Other Priors

In different embodiments, other priors may also be used apart from the ones discussed above, e.g., EPLL, Curvelets, etc.

1.5 Primal-Dual Optimization Framework

In order to estimate the latent image x, the expression in FIG. 6C needs to be minimized, however, the function as shown is not quite convex. In order to address this a primal-dual optimization approach may be used. In other embodiments, other non-linear solvers may also be used, e.g., ADMM.

Figure 7A:
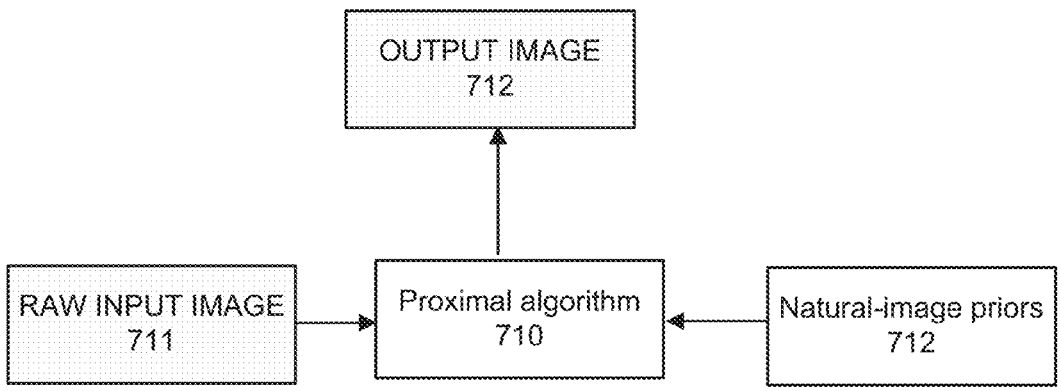
FIG. 7A is a high-level block diagram illustrating the framework of the unified and flexible camera processing system in accordance with an embodiment of the present invention.

FIG. 7A is a high-level block diagram illustrating the framework of the unified and flexible camera processing system in accordance with an embodiment of the present invention. The raw input image 711 (e.g., raw image z) is iterated over by the proximal algorithm 710, e.g., the primal-dual algorithm using natural-image priors 712 as regularizers to generate the output image 712 (which is an estimate of the latent image x). Given a raw image z, it may take as few as 5 or 6 iterations to converge to the best solution and get an estimate of the latent image x. However, the higher the number of iterations performed, the closer the convergence to the best solution.

The framework of the present invention is advantageous because it depends entirely on the system matrix A. In other words, the system matrix A essentially encapsulates the properties of the different applications. The remainder of the pipeline remains the same regardless of the system, therefore, separate code-bases are not needed for different applications. For example, the framework of the present invention can be used for applications such as interlaced HDR, super-resolution, color camera arrays, burst denoising and demosaicking or even extended to non-linear RGB applications.

Adapting the flexible framework of the present invention to different image formation models effectively requires adjusting the system matrix A. For example, for a burst application, the system matrix A would need to account for additional terms due to camera motion, e.g., displacement between the successive frames.

The framework of the present invention is also advantageous because the proximal operators decouple the individual terms in the objective function (shown in FIGS. 6B and 6C) in a principled way, making it possible to separately implement the operators for the data term and each regularizer. This approach enables mixing and matching different, highly optimized implementations of data terms and regularizers.

Figure 7B:
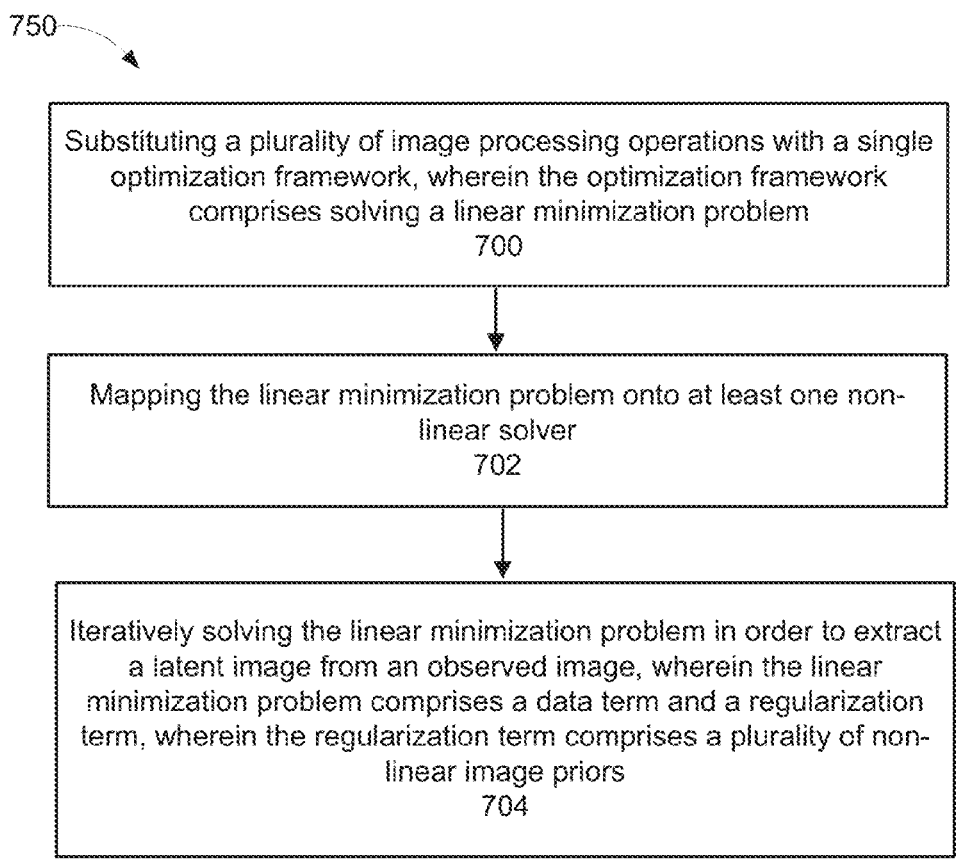
FIG. 7B depicts a flowchart of an exemplary process for determining a latent image from an observed image in accordance with an embodiment of the present invention.

FIG. 7B depicts a flowchart of an exemplary process for determining a latent image from an observed image in accordance with an embodiment of the present invention.

At step 702, a plurality of image processing operations, e.g., denoising, demosaicking, lens correction etc. (formerly performed in different stages of an ISP) are substituted with a single, integrated optimization framework. The optimization framework comprises solving a linear minimization problem, e.g., shown in FIGS. 6B and 6C.

At step 704, the linear minimization problem is mapped onto non-linear solvers. For example, primal-dual and ADMM are two non-linear solvers that can be used.

At step 706 the linear minimization problem is iteratively solved in order to extract a latent image from the observed image. The linear minimization problem comprises a data term and a regularization term as discussed above. The regularization term can comprise a plurality of non-linear image priors. In one embodiment, specifically, three exemplary image priors are used, e.g., total variation prior, cross-channel prior and denoising prior (as discussed above).

2. Efficient Implementation of the De-Noising Prior

As stated above, collaborative filtering is a powerful, yet computationally demanding denoising approach. Collaborative filtering collects similar patches, jointly filters them, and scatters the output back to input patches. Each pixel gets a contribution from each patch that overlaps with it, allowing signal reconstruction from highly corrupted data. Exploiting self-similarity, however, requires finding matching image patches, which is an expensive operation. Embodiments of the present invention provide a GPU-friendly approximated-nearest-neighbor (ANN) procedure that produces high-quality results for any type of collaborative filter.

Exploiting self-similarity requires finding data points that should have similar values (pixels in 2D images, 3D points in surface scans), e.g., pixel patches that are close together on an image subject's forehead or cheek will typically exhibit a repeated texture pattern. This matching is often done by considering an image patch, which gives more context than a single pixel and makes finding the correct matches more robust. Overlapping patches also facilitate collaborative filtering: if the image patches are, for example, of size 8×8, each pixel is part of 64 different patches, and if all those are filtered separately, each pixel receives 64 different results. These 64 results can further be filtered or averaged to obtain strongly denoised estimates. Similar patches could be found from nearby regions in the same image, or in a time sequence, from different images.

It is often desirable to find several matching patches instead of finding just the single, best match. This problem can be formulated so that the patch is interpreted as a high-dimensional vector (e.g., 64D for 8×8 patches), and the k closest vectors are found in a k-nearest-neighbor search. Relaxing the problem by requiring only approximate matches allows significant speed-ups, at only a negligible cost on the denoising performance. This leads to a class of procedures, called the approximate-nearest-neighbor (ANN) algorithms.

While some GPU-accelerated ANN techniques have been proposed previously, they all suffer from one or more problems, especially when processing high resolution images. For example, prior techniques have been unreliable in high-noise conditions. They have had suboptimal support for collaborative filtering. In certain prior techniques, complex data structures have been required for managing nodes and searching, while in other techniques, costly pre-processing is required. Most prior techniques also have a large memory footprint, which makes them impractical for mobile devices. Finally, several of the prior techniques are cumbersome to integrate into different filters. Therefore, it is difficult to switch types of filtering, e.g., weighted averaging, frequency analysis, etc. for targeting applications.

Embodiments of the present invention avoid the problems stated above while accelerating the process of searching for similar patches and facilitating high-quality collaborative filtering even on mobile devices, e.g., digital camera systems and/or mobile smart phones, etc. For example, embodiments of the present invention provide an efficient and scalable ANN implementation on GPUs, running on both desktop and mobile devices. Further, embodiments of the present invention can be integrated with all types of filters while maintaining high image quality. Finally, embodiments of the present invention can be adapted to several different applications, e.g., burst denoising, global illumination and geometry reconstruction.

2.1 Steps of the Efficient and Scalable ANN Procedure

Embodiments of the present invention work on different types of images (e.g., both 2D color images and 3D range images or meshes) and are able to handle large patch sizes (e.g., 8×8). Furthermore, the method, e.g., the search structure construction, the search, and the filtering can be run efficiently and quickly on GPUs. In fact, the ANN procedure of the present invention is configured to map well to GPUs to benefit from the parallelism of the GPUs.

2.1.1 Clustering

Figure 8A:
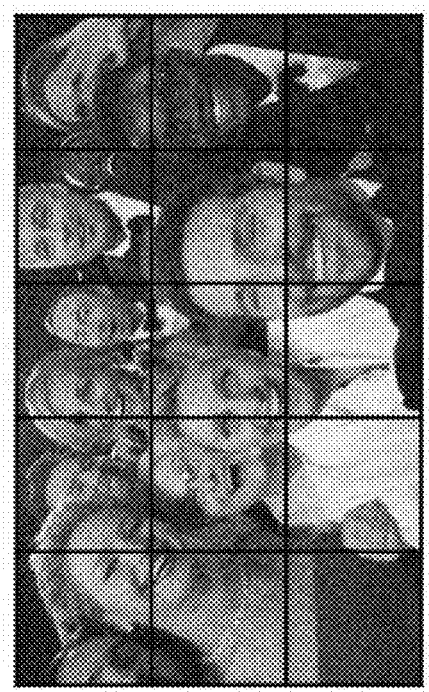
FIG. 8A illustrates the manner in which an image is split into tiles in accordance with an embodiment of the present invention.

In order to perform the ANN procedure of the present invention, an image is split into tiles. FIG. 8A illustrates the manner in which an image is split into tiles in accordance with an embodiment of the present invention. Natural images tend to be locally coherent, both spatially and temporally in case of a video or an image burst. Accordingly, it can be efficient to limit the search space by splitting an image into titles. In other embodiments, however, for collaborative filtering, full global or symmetrically centered searches may also be utilized.

Figure 8B:
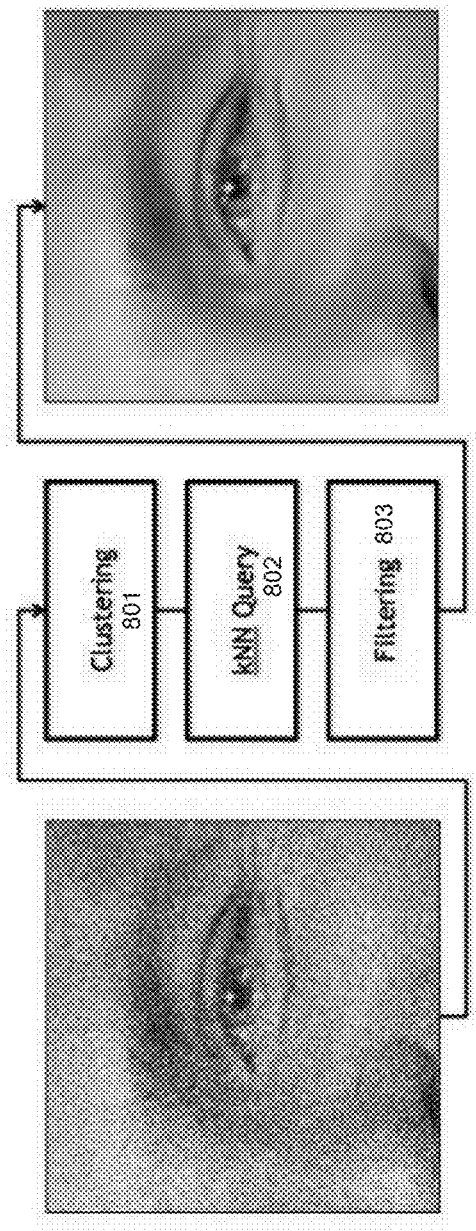
FIG. 8B depicts a flowchart of an exemplary process for performing an ANN search in accordance with an embodiment of the present invention.

FIG. 8B depicts a flowchart of an exemplary process for performing an ANN search in accordance with an embodiment of the present invention. At step 801, clustering is performed. At step 802, a kNN query is performed within each cluster. And, finally, at step 803, filtering and aggregating of the patches is performed to form an output image. Each of the steps of FIG. 8B will be discussed in more detail below.

In one embodiment, as part of step 801 (shown in FIG. 8B), to improve the query performance, patches are pre-clustered in a tile so that similar patches are grouped together. Embodiments of the present invention also fuse the data structure construction and search steps, which result in a significant speed-up over prior techniques.

As stated above, an image is first split into tiles. While each tile in the image is processed independently during query, due to collaborative filtering, the outputs will overlap. A larger tile allows finding better matches, while a smaller tile fits better into the cache or shared memory, maximizing memory locality for each query. One embodiment of the present invention uses 15×15 tiles (with 225 potential matches) and 8×8 patches. This patch size is typically large enough to be robust to noise, and small enough for efficient processing.

Figures 9A, 9B:
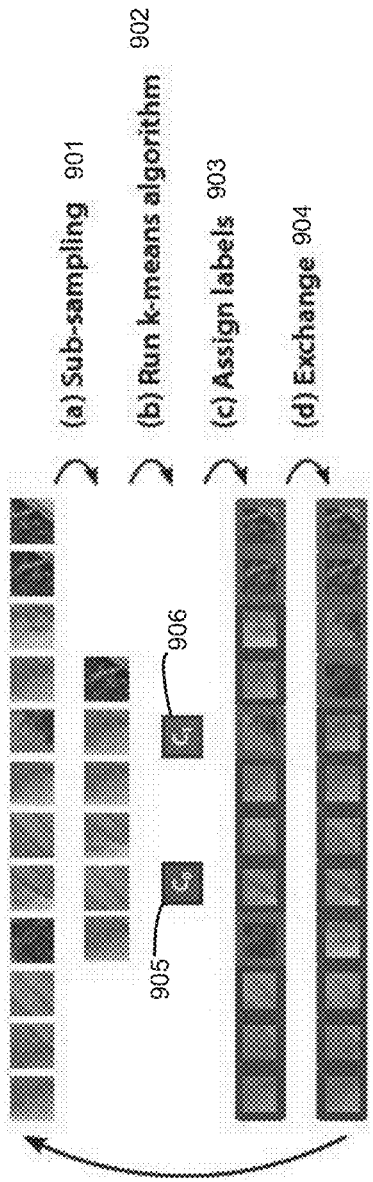
FIG. 9A illustrates the manner in which hierarchical clustering is performed in accordance with an embodiment of the present invention.
FIG. 9B summarizes the modified K-means++ procedure in accordance with an embodiment of the present invention.

FIG. 9A illustrates the manner in which hierarchical clustering is performed in accordance with an embodiment of the present invention. The patches in an image are first clustered hierarchically. At each step, the remaining patches (initially all the patches within the tile) are split into two clusters. This can be implemented with a variant of K-means++ procedure. For example, in one embodiment of the present invention, the K-means++ procedure is modified to remove irregular workloads and pseudo-random memory access patterns. This modified procedure performs better on the GPU. FIG. 9B summarizes the modified K-means++ procedure in accordance with an embodiment of the present invention.

In order to speed up the process, in one embodiment of the present invention, the K-means procedure is only performed on a subset of patches. Accordingly, at step 901, the input cluster is sub-sampled and at step 902, two new cluster centers (e.g. 905 and 906) are estimated using the K-means procedure. In one embodiment of the present invention, to find the cluster centers, eight patches out of all the patches stored in a particular cluster can be evenly selected. The sub-sampling only slightly affects the clustering quality, but can drastically reduce the computational load.

At step 903 then, each patch in the input cluster is associated with the closest of the two centers. Finally, at step 904, the patches are reorganized to produce two new sub-clusters.

The clustering process illustrated in FIG. 9A continues recursively until the size of the cluster is below a threshold, which usually is twice the number of candidates requiring for filtering. For example, for non-local means image denoising, the top 16 matches are used for each patch, in which case the recursion is stopped when the cluster is smaller than 32 patches.

2.1.2 Query and Candidate Refinement

After clustering, in one embodiment, a nearest-neighbor query can be performed. Because similar patches are grouped within the same cluster, a traditional tree traversal need not be performed. Instead, for each patch in the cluster, the ANN procedure of the present invention simply needs to find its nearest neighbors by inspecting the patches in the cluster. In one embodiment, the procedure can be configured to search additional clusters if higher quality is required.

Figure 10:
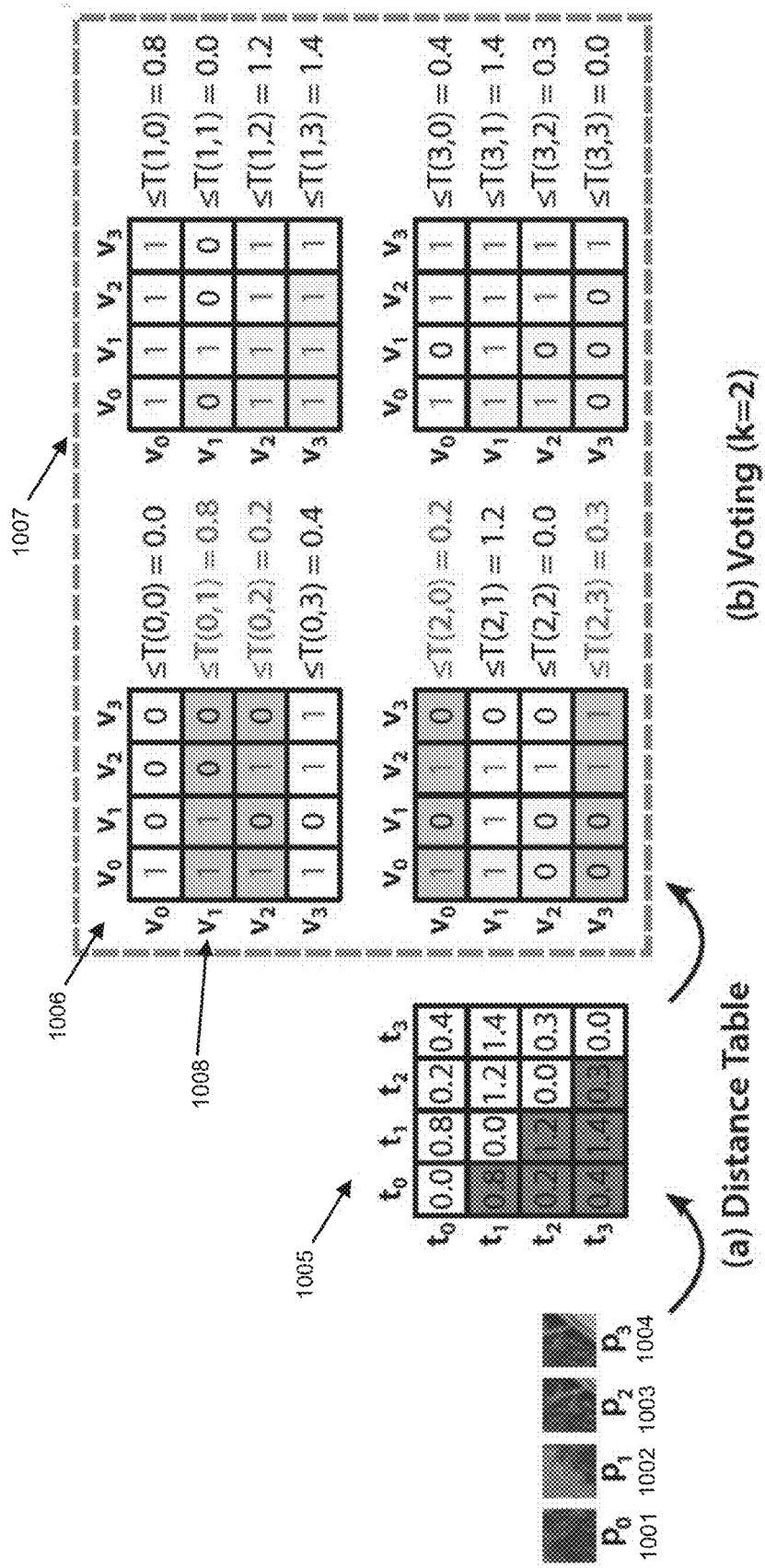
FIG. 10 illustrates the parallel exhaustive search within a cluster for performing a cluster-wide ANN lookup in accordance with an embodiment of the present invention.

FIG. 10 illustrates the parallel exhaustive search within a cluster for performing a cluster-wide ANN lookup in accordance with an embodiment of the present invention. For each patch, first, the indices of the k nearest neighbors within the same cluster are found. Finding the k nearest neighbors (here 2) for all the patches in a cluster (e.g., 4 patches $p_0$ to $p_3$ numbered 1001, 1002, 1003, 1004) is performed in two steps. First, a symmetric lookup table 1005 is computed for all pair-wise distances $\delta_{i,j}$. Next, for each path, all patch partitions are found. The first (top-left) matrix 1006 compares distances $\delta_{i,j}$ to $\delta_{0,j}$, the second (top right) matrix 1007 to $\delta_{1,j}$ and so forth.

As shown in FIG. 10, only the rows (partitions) that have k=2 are high-lighted. The columns indicate the patches closest to the patch of the row. For example, the top-most highlighted row 1008 can be interpreted to read that for patch $p_1$ 1002, the two closest patches are patches $p_0$ 1001 and $p_1$ 1002 (with a distance threshold=0.8). The rows can be directly used to binary-encode the nearest neighbors for each patch (e.g., for patch $p_0$, the encoding is 1010). In one embodiment, the indices of the nearest neighbors can be encoded as a bit field. If the maximum number of elements in a cluster is 32, a 32-bit integer suffices. Accordingly, replacing tree searches with a simple cluster look-up results not only in a tremendous speed-up, but also allows for the efficient implementation of collaborative filtering.

2.1.3 Collaborative Filtering

After the candidate list is generated, collaborative filtering can be performed in parallel for each cluster. For each patch, the nearest neighbors are fetched, the stack of matching patches is filtered, and the results are distributed to each participating patch in the output image. Since all patches within the same cluster are likely to have some common candidates, locality is maximized and computation can be drastically reduced.

2.2 Implementation of the Efficient and Scalable ANN Procedure

Embodiments of the present invention offer opportunities for extensive parallelization. First, each time can be processed in parallel. Second, the individual splits during hierarchical clustering can be parallelized. Finally, candidates for each query can be determined in parallel. Using the available parallelism in a GPU, however, poses additional challenges, which are listed below:

1. Register pressure: Keeping a local copy of a single high-dimensional input vector may exceed the per-thread register file. Computations such as K-means ultimately lead to spilling registers to slower memory.

2. Memory access patterns. The clustering algorithm groups unrelated patches to nearby memory locations, leading to inefficient, scattered memory access patterns.

3. Thread divergence. The number of instructions executed for clustering depends on the data. Threads within the same warp but working on different nodes will show varying execution times and divergence reduces performance.

4. Kernel launch overhead. Launching a kernel at each level of hierarchical clustering imposes a serious overhead. Determining efficient thread setups for unbalanced clusters adds another layer of complexity.

5. Memory footprint. Computing and storing the candidates for all queries in parallel can result in serious memory and bandwidth requirements when storing the candidate information (particularly important on a mobile SoC).

Embodiments of the present invention provide an efficient GPU procedure addressing all the aforementioned challenges.

2.2.1 Clustering Implementation

As shown in FIG. 8B, the first step for performing the ANN search in accordance with an embodiment of the present invention is clustering. The input data for the ANN procedure of the present invention is given by high-dimensional patch data that usually surrounds the current pixel (image data) or the current vertex (3D mesh data). Extracting this patch data from the original input representation would significantly increase memory consumption as it duplicates the overlapping input data. Because the clustering stage simply clusters similar patches without altering the patch data, it is more efficient for the ANN procedure of the present invention to store and work on references (e.g., the pixel coordinates). This way, cache hit rates also increase as neighboring patches access overlapping regions. In video and image stack processing, the data reference can include the frame number; in mesh processing the vertex index can be used as a reference.

In one embodiment of the present invention, the major workload of clustering is performed by the 2-means procedure, which is repeatedly run to generate a hierarchical clustering.

Binary clustering is an inherently diverging and irregular task, both at the instruction level and in terms of memory consumed. During clustering, distances between arbitrary patches may be computed. Clustering at thread level would impose several problems mentioned above, e.g., register pressure, memory access patterns, thread divergence, etc.

To address these problems, embodiments of the present invention use a warp-wide binary clustering procedure based on shuffle instructions. As is well known in the art, GPUs typically have a number of multiprocessors, each of which execute in parallel with the others. For example, a GPU processor can have 12 groups of 16 stream processors (cores). Each core can execute a sequential thread, but typically the cores execute in a SIMT (Single Instruction, Multiple Thread) fashion; all cores in the same group can execute the same instruction at the same time. The code is typically executed in groups of 32 threads, called a warp. It may take a GPU multiprocessor two cycles to execute one instruction for an entire warp on each group of 16 cores, for integer and single-precision operations. There is also a small software-managed data cache attached to each multiprocessor, shared among the cores called a shared memory.

Shuffle instructions on a GPU permit the exchange of a variable between threads of the same warp without use of shared memory. This allows the procedure to maintain only a subset of the high-dimensional data in each thread, thereby, reducing register usage. Furthermore, assigning successive dimensions to the individual threads in the warp automatically leads to good memory access patterns since the input dimensions sit next to each other in memory. Using multiple threads to split a single cluster (node) offers the opportunity to alter the roles of individual threads for the different steps of the K-means procedure.

Figure 11:
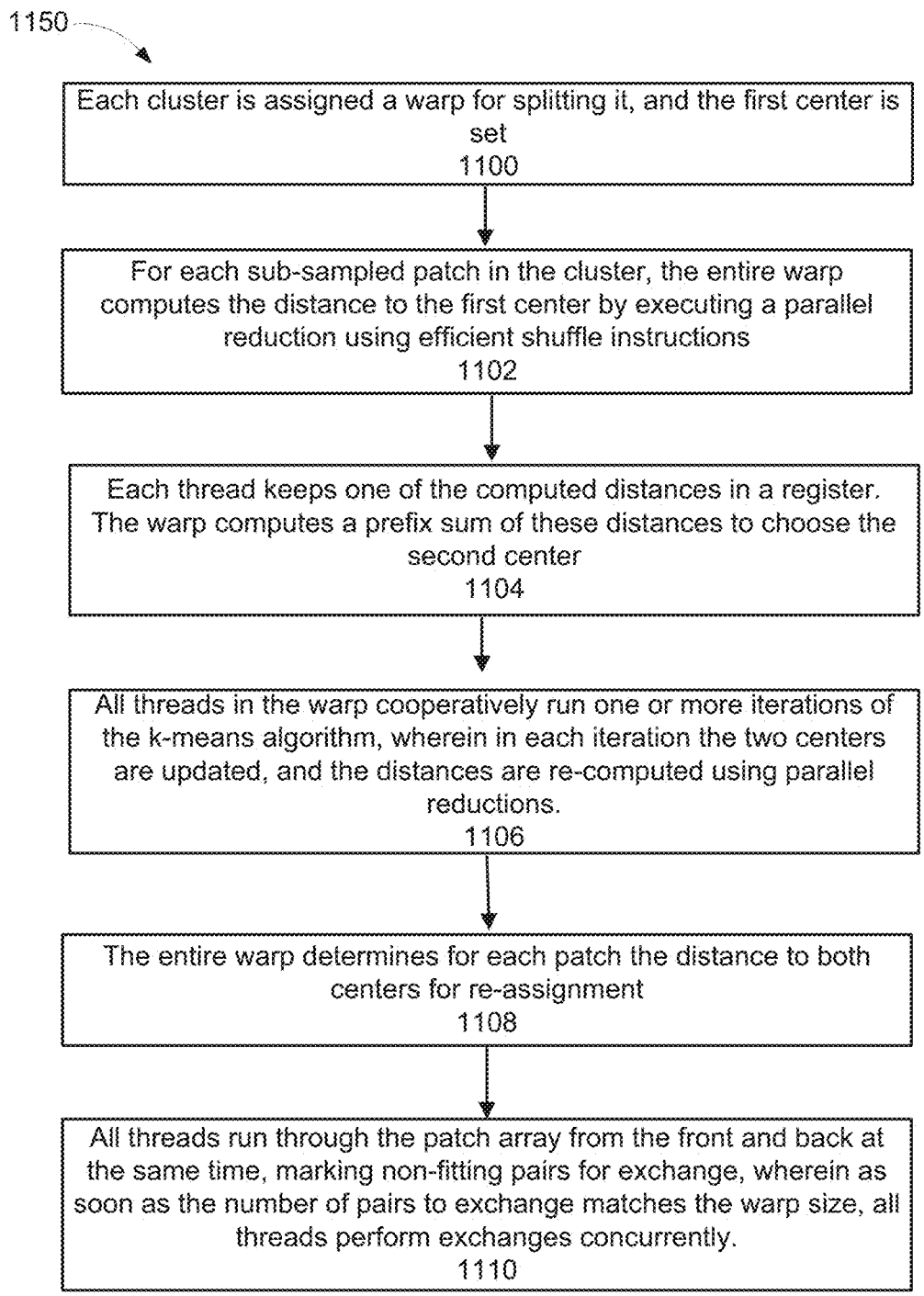
FIG. 11 depicts a flowchart of an exemplary process for performing warp-wide binary clustering in accordance with one embodiment of the present invention.

FIG. 11 depicts a flowchart of an exemplary process for performing warp-wide binary clustering in accordance with one embodiment of the present invention.

At step 1100, each cluster is assigned a warp for splitting it, and the first center is set.

At step 1102, for each sub-sampled patch in the cluster, the entire warp computes the distance to the first center by executing a parallel reduction using efficient shuffle instructions.

At step 1104, each thread keeps one of the computed distances in a register, wherein the warp computes a prefix sum of these distances to choose the second center.

At step 1106, all the threads in the warp cooperatively run one or more iterations of the K-means procedure. In one embodiment, at most five iterations are run. At each iteration, the two centers are updated, and the distances are re-computed using parallel reductions.

At step 1108, the entire warp determines for each patch the distance to both centers for re-assignment.

At step 1110, all threads run through the patch array from the front and back at the same time, marking non-fitting pairs for exchange, wherein, as soon as the number of pairs to exchange matches the warp size, all threads perform exchanges concurrently.

The steps above address several of the implementation issues addressed above, including, register pressure, memory access patterns and thread divergence, as an entire warp works on the same problem. Also, the problem of low parallelism on the first levels of hierarchical clustering is reduced, as the number of threads working at each level is multiplied by warp size.

In order to mitigate the problem related to kernel launch overhead during hierarchy creation discussed above, embodiments of the present invention use a task queue in combination with a persistent threads implementation. In one embodiment, the task queue can be used to maintain identifiers (lowerindex and upperindex) for each node that still needs to be split. Each worker warp draws such an identifier pair from the queue, splits the corresponding node, puts the identifier for one child back into the queue, and starts working on the other child. In this way, only a single kernel launch is needed and nodes at different levels can be worked on concurrently.

2.2.2 Query Implementation

The second step for performing the ANN procedure of the present invention, as shown in FIG. 8B, is a kNN query. After clustering, similar patches are grouped in the same cluster. The next closest set of patches can be found in the adjacent clusters. This spatial relationship allows quick retrieval of potential candidates without costly traversal.

In order to address the issues of register pressure and memory access patterns discussed above, in one embodiment, warp-wide computations (as discussed in regards to clustering) are performed (instead of using a single thread) to select the candidates. To determine the candidates for an entire cluster, an entire block of threads may be used. Each warp is then used to compute a set of inter-path distances. Because the distance is symmetrical, all the pair-wise distances can be pre-computed within a cluster, and stored in share memory as illustrated in FIG. 10. Each entry T (i,j) stores the value of $\delta_{i,j}$ for patches $P_i$ and $P_j$.

In one embodiment, once the matrix 1005 is computed, each warp is assigned to generate the candidates for a single patch $P_s$. Instead of sorting all candidates, in one embodiment, a voting scheme can be followed, wherein each patch $P_i$ in the cluster is uniquely assigned to one of the threads in the warp. If the cluster size matches the warp size, every thread is responsible for a single patch. Subsequently, the procedure iteratively tries to find the distance threshold λ with respect to $P_s$, which yields k candidates. Because all the possible threshold are in the matrix, the procedure only needs to iterate over the stored distances. Also, in one embodiment of the present invention, to compute the number of patches that fall within the threshold, the procedure uses ballot and popc instructions.

Figure 12:
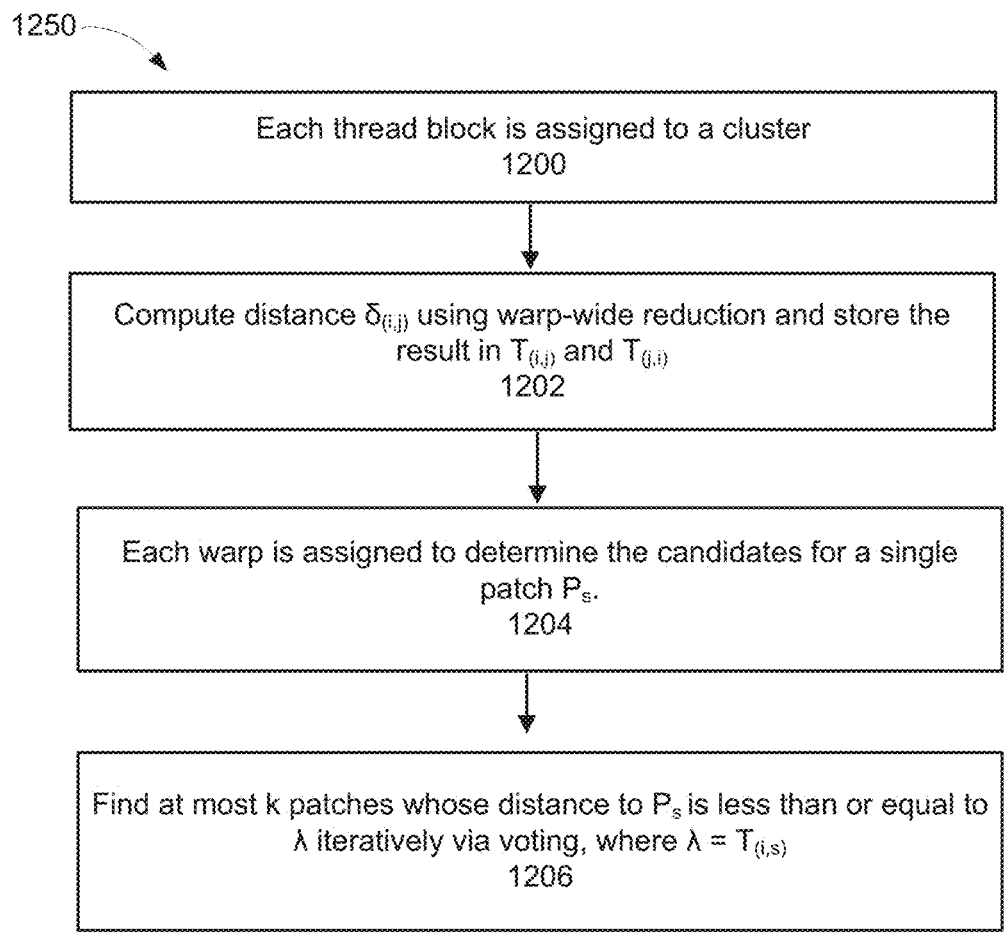
FIG. 12 depicts a flowchart of an exemplary process for performing querying to determine candidates in accordance with an embodiment of the present invention.

FIG. 12 depicts a flowchart of an exemplary process for performing querying to determine candidates in accordance with an embodiment of the present invention.

At step 1202, each thread block is assigned to a cluster.

At step 1204, distance $\delta_{i,j}$ is computed using warp-wide reduction and the results are stored in shared memory (e.g., $T_{(i,j)}$ and $T_{(i,j)}$ as shown in FIG. 10.)

At step 1206, each warp is assigned to determine the candidates for a single patch $P_s$.

At step 1208, at most k patches are found whose distance to $P_s$ is less than or equal to $\lambda$ iteratively via voting, wherein $\lambda = T(i,s)$.

In one embodiment of the present invention, candidates are only searched in the same cluster or within two neighboring clusters without the additional expense of shared memory. Accordingly, all candidate patch references are close in memory after indexing. This property can be exploited to reduce the memory requirements when encoding the candidates, thereby, reducing the memory footprint. Instead of storing each individual candidate index, the procedure can store the candidate index within the cluster using a bit field. This strategy enables the use of the voting scheme result (ballot instruction) directly to encode the candidates, reducing the memory requirement to as many bits as there are elements in a cluster.

2.2.3 Filtering Implementation

While clustering and querying were covered in greater detail above, most of the same techniques can also be used during the filtering stage that follows the query stage in most applications. For example, in one embodiment, when working with patch data, the procedure can use an entire warp to work on a single patch to reduce register pressure and per-thread shared memory requirements. All optimizations reducing data load and store can also be used during filtering.

During collaborative filtering, the ANN procedure of the present invention can take advantage of the grouping of similar patches. Often, steps in collaborative filtering, such as the transformation in B3MD filtering or the distance computations between patches in NLM, can be formulated as precomputations. In one embodiment of the present invention, the filtering implementation comprises starting a block of threads for each cluster and running the precomputations only for the patches in that cluster. Intermediate results can be stored in fast local shared memory.

Finally, the candidate encoding scheme of the present invention also allows further optimizations. In many cases, the same set of candidates is used for multiple patches in a cluster (e.g., if patch b and c are candidates for a, a and c are likely going to be candidates for b.) Accordingly, certain computations can be run once for all patches that share the same candidate set and the results can be used for all patches. Due to the bitwise candidate encoding, the ANN procedure can further find equal candidate sets using simple comparisons.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer implemented method of performing an approximate-nearest-neighbor search, said method comprising:
   splitting an image into a plurality of tiles;
   for each of said plurality of tiles, perform the following in parallel on a processor:
      dividing image patches into a plurality of clusters, wherein each cluster comprises similar images patches, and wherein said dividing continues recursively until a size of a cluster is below a threshold value;
      performing a nearest-neighbor query within each of said plurality of clusters; and
      performing collaborative filtering in parallel for each image patch, wherein said collaborative filtering aggregates and processes nearest neighbor image patches from a same cluster containing a respective image patch to form an output image.

2. The method of claim 1, wherein said dividing is performed using a hierarchical 2-means clustering process.

3. The method of claim 2, wherein said hierarchical 2-means clustering process is implemented utilizing shuffle instructions, wherein said shuffle instructions exchange data between threads within a warp running on said processor without using shared memory.

4. The method of claim 1, wherein said performing a nearest-neighbor query comprises finding a plurality of nearest neighbor candidates for each image patch within each of said plurality of clusters.

5. The method of claim 4, wherein a warp is operable to find said plurality of nearest neighbor candidates for each image patch, wherein said warp comprises a plurality of processing threads.

6. The method of claim 5, wherein said performing a nearest-neighbor query further comprises:
computing a plurality of pair-wise distances between image patches within a same cluster using warp-wide reduction;
storing said plurality of pair-wise distances in shared memory; and
determining a plurality of nearest neighbor candidates using a voting process, wherein said voting process checks each of said plurality of pair-wise distances to determine whether they are below a pre-determined threshold.

7. The method of claim 6, wherein said performing a nearest-neighbor query further comprises:
storing an index for each nearest-neighbor candidate within a same cluster using a bit-field.

8. A non-transitory computer-readable storage medium having stored thereon, computer executable instructions that, if executed by a computer system cause the computer system to perform a method of performing an approximate-nearest-neighbor search, said method comprising:
splitting an image into a plurality of tiles;
for each of said plurality of tiles, perform the following in parallel on a processor:
dividing image patches into a plurality of clusters, wherein each cluster comprises similar images patches, and wherein said dividing continues recursively until a size of a cluster is below a threshold value;
performing a nearest-neighbor query within each of said plurality of clusters; and
performing collaborative filtering in parallel for each image patch, wherein said collaborative filtering aggregates and processes nearest neighbor image patches from a same cluster containing a respective image patch to form an output image.

9. The computer-readable medium as described in claim 8, wherein said dividing is performed using a hierarchical 2-means clustering process.

10. The computer-readable medium as described in claim 9, wherein said hierarchical 2-means clustering process is implemented utilizing shuffle instructions, wherein said shuffle instructions exchange data between threads within a warp running on said processor without using shared memory.

11. The computer-readable medium as described in claim 8, wherein said performing a nearest-neighbor query comprises finding a plurality of nearest neighbor candidates for each image patch within each of said plurality of clusters.

12. The computer-readable medium as described in claim 11, wherein a warp is operable to find said plurality of nearest neighbor candidates for each image patch, wherein said warp comprises a plurality of processing threads.

13. The computer-readable medium as described in claim 12, wherein said performing a nearest-neighbor query further comprises:
computing a plurality of pair-wise distances between patches within a same cluster using warp-wide reduction;
storing said plurality of pair-wise distances in shared memory; and
determining a plurality of nearest neighbor candidates using a voting process, wherein said voting process checks each of said plurality of pair-wise distances to determine whether they are below a pre-determined threshold.

14. The computer-readable medium as described in claim 13, wherein said performing a nearest-neighbor query further comprises:
storing an index for each nearest-neighbor candidate within a same cluster using a bit-field.

15. A system for performing an approximate-nearest-neighbor search, said system comprising:
a memory storing information related to denoising an image;
a processor coupled to said memory, said processor operable to implement a method of performing an approximate-nearest-neighbor search, said method comprising:
splitting an image into a plurality of tiles;
for each of said plurality of tiles, perform the following in parallel on a processor:
dividing image patches into a plurality of clusters, wherein each cluster comprises similar images patches, and wherein said dividing continues recursively until a size of a cluster is below a threshold value;
performing a nearest-neighbor query within each of said plurality of clusters; and
performing collaborative filtering in parallel for each image patch, wherein said collaborative filtering aggregates and processes nearest neighbor image patches from a same cluster containing a respective image patch to form an output image.

16. The system of claim 15, wherein said dividing is performed using a hierarchical 2-means clustering.

17. The system of claim 16, wherein said hierarchical 2-means clustering process is implemented utilizing shuffle instructions, wherein said shuffle instructions exchange data between threads within a warp running on said processor without using shared memory.

18. The system of claim 15, wherein said performing a nearest-neighbor query comprises finding a plurality of nearest neighbor candidates for each image patch within each of said plurality of clusters.

19. The system of claim 18, wherein a warp is operable to find said plurality of nearest neighbor candidates for each image patch wherein said warp comprises a plurality of processing threads.

20. The system of claim 19, wherein said performing a nearest-neighbor query further comprises:
computing a plurality of pair-wise distances between patches within a same cluster using warp-wide reduction;
storing said plurality of pair-wise distances in shared memory; and
determining a plurality of nearest neighbor candidates using a voting process, wherein said voting process checks each of said plurality of pair-wise distances to determine whether they are below a pre-determined threshold.

21. The system of claim 20, wherein said performing a nearest-neighbor query further comprises:

storing an index for each nearest-neighbor candidate within a same cluster using a bit-field.

\* \* \* \* \*